(12) United States Patent
Tsuchiya et al.

(10) Patent No.: US 8,854,456 B2
(45) Date of Patent: Oct. 7, 2014

(54) TRAVEL DISTANCE DETECTION DEVICE AND TRAVEL DISTANCE DETECTION METHOD

(75) Inventors: Chikao Tsuchiya, Yokohama (JP); Hiroyuki Furushou, Atsugi (JP); Shinya Tanaka, Zama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 340 days.

(21) Appl. No.: 13/164,404

(22) Filed: Jun. 20, 2011

(65) Prior Publication Data

US 2011/0310245 A1    Dec. 22, 2011

(30) Foreign Application Priority Data

Jun. 21, 2010  (JP) ................................. 2010-140319

(51) Int. Cl.
| | |
|---|---|
| *H04N 7/18* | (2006.01) |
| *G01S 11/12* | (2006.01) |
| *G06K 9/78* | (2006.01) |
| *G06T 7/20* | (2006.01) |
| *G06T 7/60* | (2006.01) |
| *H04N 5/225* | (2006.01) |

(52) U.S. Cl.
CPC *G01S 11/12* (2013.01); *H04N 7/18* (2013.01); *G06K 9/78* (2013.01); *G06T 7/2053* (2013.01); *G06T 7/602* (2013.01); *G06T 2207/10016* (2013.01); *G06T 2207/30256* (2013.01)
USPC .......................... 348/135; 348/218.1; 382/103

(58) Field of Classification Search
CPC ............. G06K 9/00; G06K 9/36; H04N 7/18; H04N 13/00; H04N 7/181; G09G 5/00; G01B 11/022; G01B 11/024; G01C 15/00
USPC ............... 348/135, E07.085, 106, 218.1, 222, 348/363, 148; 382/106, 103, 104, 107, 284, 382/154; 340/995.1; 345/634, 633
See application file for complete search history.

(56) References Cited

U.S. PATENT DOCUMENTS 5,889,878 A * 3/1999 Togashi ........................ 382/103
8,285,010 B2 * 10/2012 Rowe ............................ 382/124

(Continued)

FOREIGN PATENT DOCUMENTS

| JP | 9-81738 A | 3/1997 |
|---|---|---|
| JP | 2007-300559 A | 11/2007 |

(Continued)

*Primary Examiner* — Dave Czekaj
*Assistant Examiner* — Dramos I Kalapodas
(74) *Attorney, Agent, or Firm* — Foley & Lardner LLP (57) ABSTRACT

A travel distance detection device includes: an image-capturing unit configured to capture an image; an alignment unit configured to align images in position of bird's-eye view image, the images captured at different times by the image-capturing unit; and a solid object detection unit configured to detect a solid object based on difference image data between data of the images captured at the different times and aligned by the alignment unit. The solid object detection unit counts the number of pixels which each express a certain difference on the difference image data and which are arranged in a direction in which the solid object is inclined when the image of the predetermined region is converted into the bird's-eye view image, then produces a frequency distribution of the counted pixels to generate a difference waveform, and calculates a travel distance of the solid object based on time variation of the difference waveform.

21 Claims, 10 Drawing Sheets

(56) References Cited

U.S. PATENT DOCUMENTS

| | | |
|---|---|---|
| 2002/0126875 A1* | 9/2002 | Naoi et al. .................... 382/104 |
| 2003/0197626 A1* | 10/2003 | Endo et al. ................. 340/995.1 |
| 2006/0177107 A1* | 8/2006 | Ishii .............................. 382/115 |
| 2007/0230785 A1 | 10/2007 | Watanabe |
| 2008/0043113 A1* | 2/2008 | Ishii ........................... 348/218.1 |
| 2008/0205706 A1 | 8/2008 | Hongo |
| 2008/0298642 A1* | 12/2008 | Meenen ........................ 382/115 |
| 2009/0092334 A1* | 4/2009 | Shulman et al. .............. 382/284 |
| 2009/0122140 A1* | 5/2009 | Imamura ...................... 348/148 |
| 2009/0190800 A1* | 7/2009 | Takahashi .................... 382/104 |
| 2010/0002078 A1* | 1/2010 | Ito ................................ 348/135 |
| 2010/0045788 A1* | 2/2010 | Zhang et al. ................... 348/77 |
| 2010/0134593 A1* | 6/2010 | Kakinami ....................... 348/43 |
| 2010/0142771 A1* | 6/2010 | Miura et al. .................. 382/124 |
| 2010/0149333 A1 | 6/2010 | Yang |
| 2010/0215218 A1* | 8/2010 | Takahashi .................... 382/104 |
| 2010/0310137 A1* | 12/2010 | Chou et al. ................... 382/124 |
| 2011/0026771 A1* | 2/2011 | Hsu et al. ..................... 382/104 |

FOREIGN PATENT DOCUMENTS

| | | |
|---|---|---|
| JP | 2008-219063 A | 9/2008 |
| JP | 2009-93332 A | 4/2009 |
| JP | 2010-109451 A | 5/2010 |
| JP | 2010-128939 A | 6/2010 |

* cited by examiner

TRAVEL DISTANCE DETECTION DEVICE AND TRAVEL DISTANCE DETECTION METHOD

TECHNICAL FIELD

The disclosure relates to a travel distance detection device and a travel distance detection method for detecting a travel distance based on images captured at different times.

BACKGROUND

As shown in Japanese Patent Application Laid-Open No. 2008-219063, a vehicle surroundings monitoring device configured to detect a solid object around a vehicle and to detect whether the solid object is stationary or moving has heretofore been disclosed. This vehicle surroundings monitoring device is configured to convert two images captured at different times into bird's-eye view images, and to align the two bird's-eye view images. Then, the vehicle surrounding monitoring device acquires a difference between the two images after the alignment and detects a different portion as a solid object. Further, the vehicle surroundings monitoring device detects the nearest point of the different portion to its own vehicle as a grounding point where the solid object is in contact with the ground, and detects whether the solid object is stationary or moving based on a positional change of the grounding point.

Here, it is known that the solid object is inclined when the captured image is converted into the bird's-eye view image. Due to such inclination, the vehicle surroundings monitoring device disclosed in Patent Literature 1 cannot achieve very high detection accuracy in detecting a travel distance of the solid object. Specifically, since the vehicle surroundings monitoring device disclosed in Patent Literature 1 detects the grounding point, the device calculates the travel distance based on a travel amount of the grounding point in order to obtain the travel distance. However, the travel distance thus calculated is not correct if a point detected as the grounding point before the travel and a point detected as the grounding point after the travel are not the same point of the solid object. To be more precise, there may be a case where the point detected as the grounding point before the travel is a lower end of a tire of another vehicle, whereas the point detected as the grounding point after the travel is a bumper thereof, for example. In this case, the travel distance is calculated based on not the same position of the vehicle and the travel distance thus calculated is incorrect.

An object of the present invention is to provide a travel distance detection device and a travel distance detection method which are capable of improving accuracy in calculating a travel distance.

SUMMARY

According to an embodiment of the present invention, there is provided a travel distance detection device including: an image-capturing unit configured to capture an image of a predetermined region, an alignment unit configured to align positions in a bird's-eye view image between images of the predetermined region obtained by image capturing at different times with the image-capturing unit, and a solid object detection unit configured to detect a solid object based on difference image data between image data at the different times aligned by the alignment unit. Here, the solid object detection unit counts the number of pixels which each express a certain difference on the difference image data and which are arranged in a direction in which the solid object is inclined when the image in the predetermined region is converted into the bird's-eye view image, and produces a frequency distribution of the counted pixels to generate a difference waveform. Then the solid object detection unit calculates a travel distance of the solid object based on time variation of the difference waveform.

BRIEF DESCRIPTION OF DRAWINGS

FIGS. 4A and 4B are top views showing an outline of processing by an alignment unit shown in FIG. 3; FIG. 4A shows a traveling state of the vehicle; and FIG. 4B shows an outline of alignment.

DESCRIPTION OF EMBODIMENTS

Figure 1:
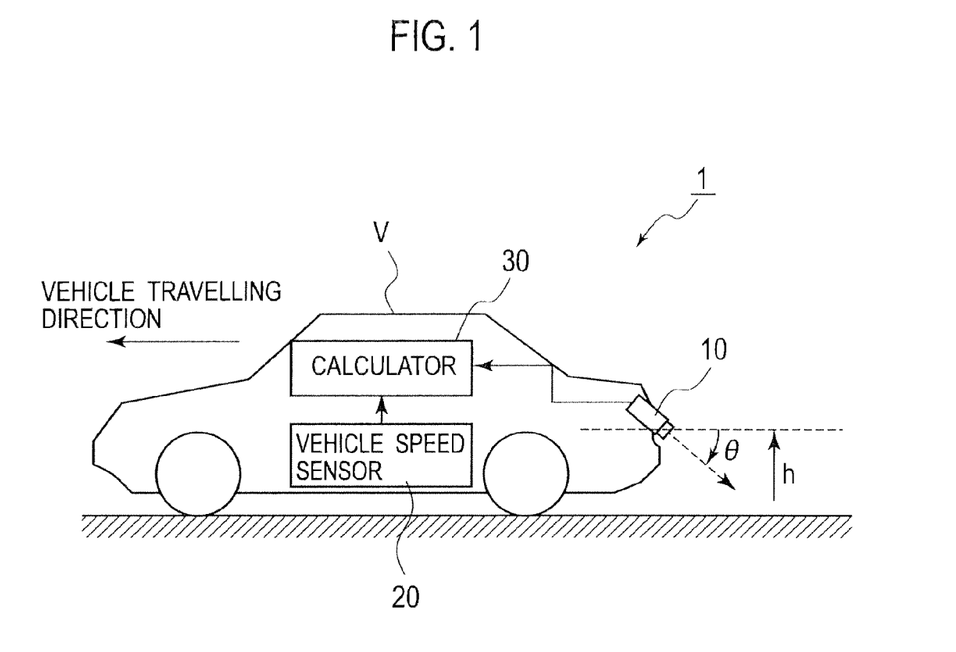
FIG. 1 is a schematic configuration diagram of a travel distance detection device according to an embodiment, showing an example in which the travel distance detection device is mounted on a vehicle.

Now, embodiments according to the present invention will be described below with reference to the accompanying drawings. FIG. 1 is a schematic configuration diagram of a travel distance detection device 1 according to the embodiment, showing an example in which the travel distance detection device 1 is mounted on a vehicle V. As shown in FIG. 1, the travel distance detection device 1 includes a camera (as example of an image-capturing unit and an image-capturing means) 10, a vehicle speed sensor 20, and a calculator 30.

The camera 10 shown in FIG. 1 is installed in a position at a height h of a rear part of the vehicle V such that an optical axis forms a downward angle θ relative to a horizontal line. The camera 10 is configured to capture a predetermined region from this position. The vehicle speed sensor 20 is configured to detect a running speed of the vehicle V and to calculate the speed from a wheel speed detected by using a wheel speed sensor provided on a wheel to detect revolutions thereof, for example. The calculator 30 is configured to calculate a travel distance and a traveling speed of a solid object located behind the vehicle.

Figure 2:
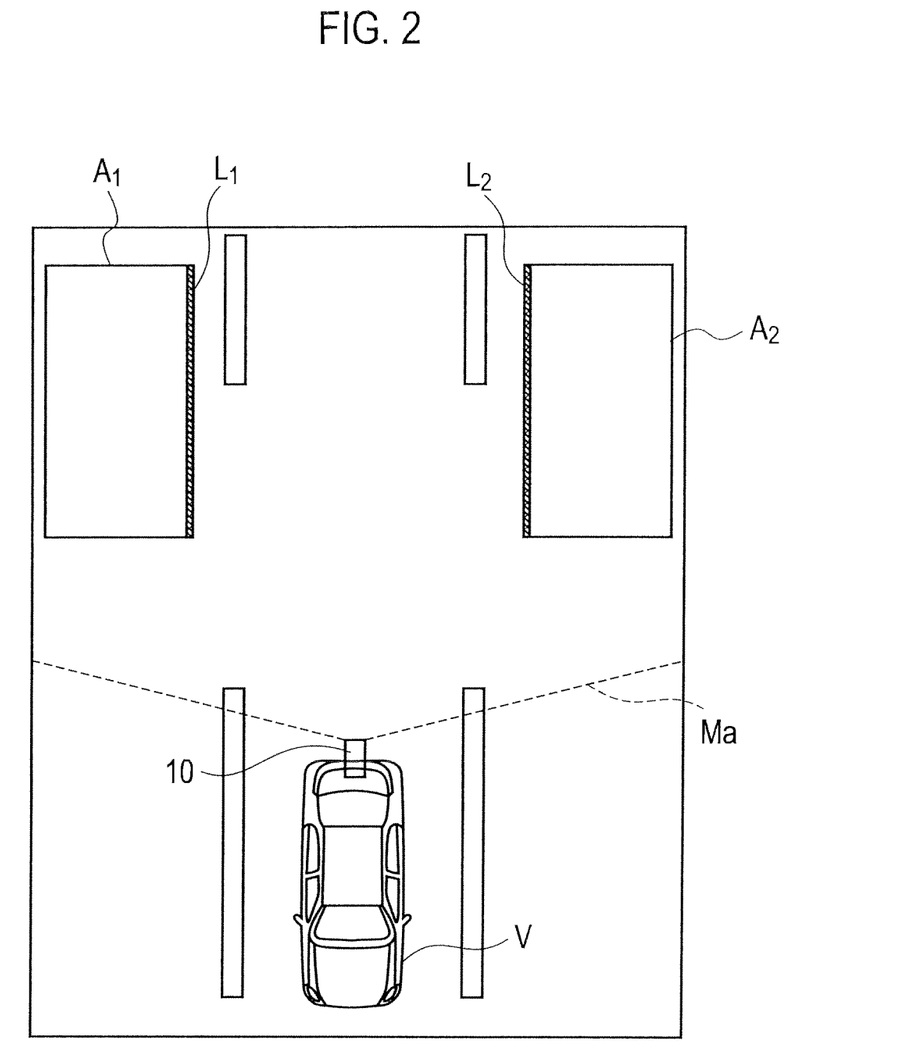
FIG. 2 is a top view showing a running state of the vehicle shown in FIG. 1.

FIG. 2 is a top view showing a running state of the vehicle V shown in FIG. 1. As shown in FIG. 2, the camera 10 captures a rear side of the vehicle at a predetermined view angle Ma. At this time, the camera 10 is able to capture a lane where the own vehicle V is running and neighboring lanes on the right and left as well within the view angle thereof.

Figure 3:
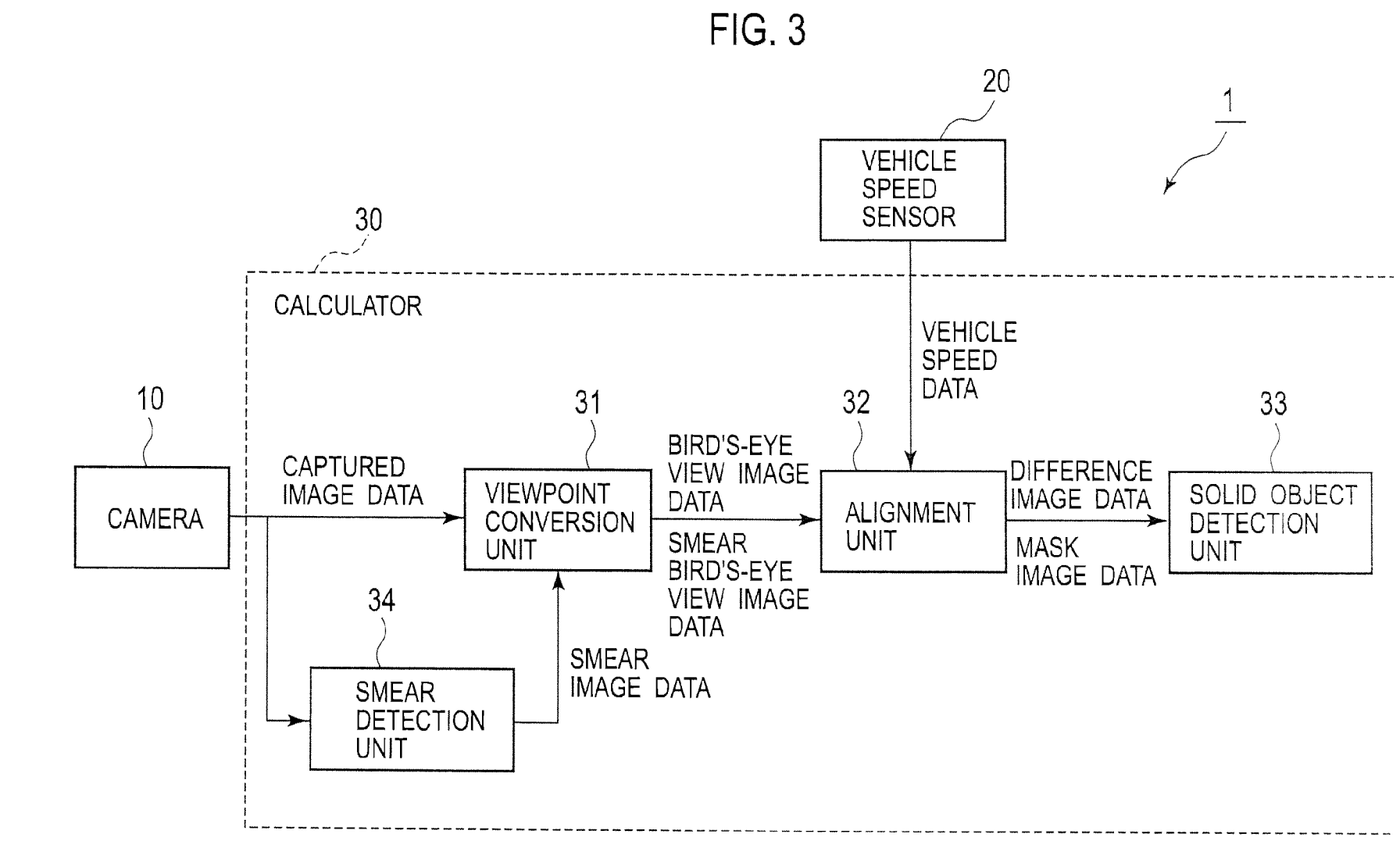
FIG. 3 is a block diagram showing details of a calculator shown in FIG. 1.

FIG. 3 is a block diagram showing details of the calculator 30 shown in FIG. 1. Note that the camera 10 and the vehicle speed sensor 20 are also illustrated in FIG. 3 in order to clarify the relation of connection.

As shown in FIG. 3, the calculator 30 includes a viewpoint conversion unit (viewpoint converting means) 31, an alignment unit (aligning means) 32, and a solid object detection unit (solid object detecting means) 33.

The viewpoint conversion unit 31 is configured to input image data of the predetermined region captured by the camera 10 and to perform viewpoint conversion to convert the inputted image data into bird's-eye view image data of an image viewed from bird's eyes. The image viewed from bird's eyes is an image viewed from a virtual camera that looks vertically downward from above, for example. Such viewpoint conversion is performed as disclosed in Japanese Patent Application Laid-Open No. 2008-219063, for example.

Figure 4A:
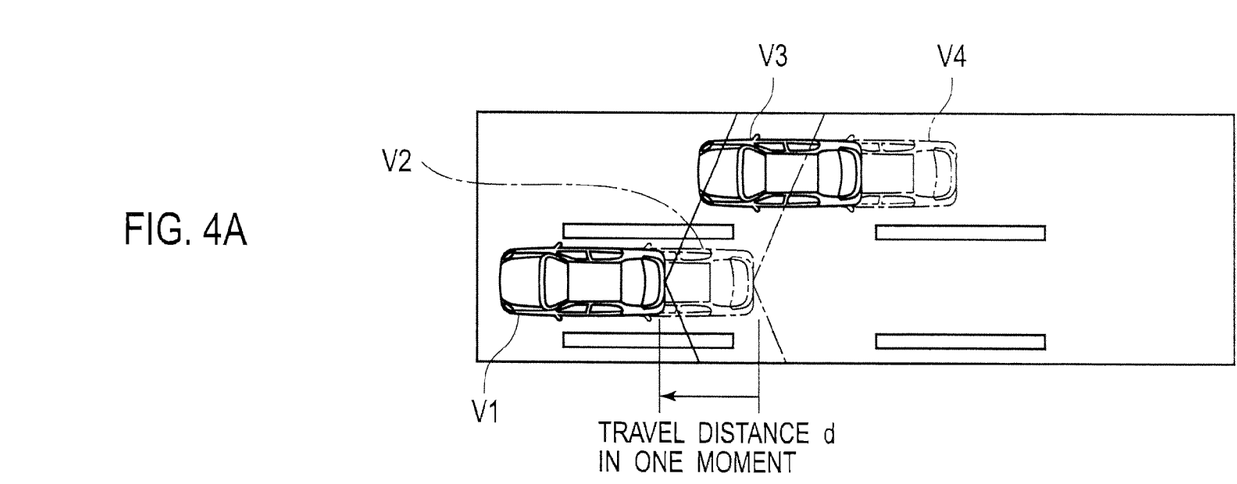
Figure 4B:
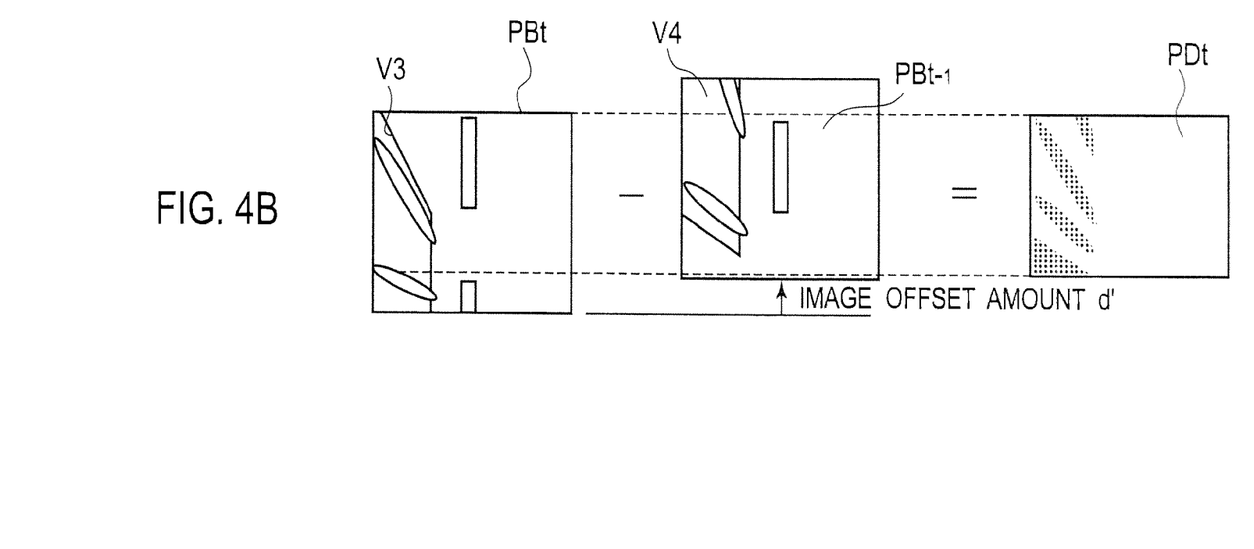

The alignment unit 32 is configured to sequentially input the bird's-eye view image data obtained by viewpoint conversion with the viewpoint conversion unit 31 and to align positions of the inputted bird's-eye view image data at different times. FIGS. 4A and 4B are top views showing an outline of processing by the alignment unit 32 shown in FIG. 3; FIG. 4A shows a traveling state of the vehicle V; and FIG. 4B shows an outline of alignment.

As shown in FIG. 4A, the own vehicle V at a current time is assumed to be located at V1 and the own vehicle V at a time one moment earlier is assumed to be located at V2. Meanwhile, another vehicle V is assumed to be located behind the own vehicle V and running parallel to the own vehicle V. Here, the other vehicle V at the current time is assumed to be located at V3 and the other vehicle V at the time one moment earlier is assumed to be located at V4. Moreover, the own vehicle V is assumed to have moved by a distance d in the one moment. Here, the time one moment earlier may be time which is a predetermined time period (such as one control cycle) before the current time or may be time which is an arbitrary time period before the current time.

In this state, a bird's-eye view image (a current image) $PB_t$ at the current time is as shown in FIG. 4B. In this bird's-eye view image $PB_t$, a white line drawn on a road is rectangular, thereby representing a state of being relatively accurately viewed from above. On the other hand, the other vehicle V3 is inclined. Similarly, in a bird's-eye view image (a past image) $PB_{t-1}$ at the time one moment earlier as well, the white line drawn on the road is rectangular, thereby representing the state of being relatively accurately viewed from above. On the other hand, the other vehicle V4 is inclined.

The alignment unit 32 aligns the above-described bird's-eye view images $PB_t$ and $PB_{t-1}$ on the data. Here, the alignment unit 32 offsets the bird's-eye view image $PB_{t-1}$ at the time one moment earlier to coincide the position thereof with the position of the bird's-eye view image $PB_t$ at the current time. An image offset amount d' is an amount corresponding to the travel distance d shown in FIG. 4A, which is determined based on a signal from the vehicle speed sensor 20 and the time period from the time one moment earlier to the current time.

Meanwhile, after the alignment, the alignment unit 32 finds out a difference between the bird's-eye view images $PB_t$ and $PB_{t-1}$ to generate data of a difference image $PD_t$. Here, a pixel value of the difference image $PD_t$ may be defined by finding an absolute value of a difference between pixel values of the bird's-eye view images $PB_t$ and $PB_{t-1}$ or may be defined as "1" when the absolute value exceeds a predetermined threshold and as "0" when the absolute value does not exceed the threshold in order to deal with a change in an illuminance environment.

Reference is made again to FIG. 3. The solid object detection unit 33 detects a solid object based on the data of the difference image $PD_t$ as shown in FIG. 4B. In this case, the solid object detection unit 33 also calculates a travel distance of the solid object in an actual space. Upon calculation of the travel distance, the solid object detection unit 33 firstly generates a difference waveform.

Upon generation of the difference waveform, the solid object detection unit 33 sets up detection regions in the difference image $PD_t$. Specifically, as shown in FIG. 2, the detection regions $A_1$ and $A_2$ in the embodiment are set up in rectangular shapes sideways behind the own vehicle V. Here, the travel distance detection device 1 according to the embodiment aims at calculating the travel distance relative to the other vehicle which may come into contact when the own vehicle changes lanes. For this reason, the detection regions $A_1$ and $A_2$ are set up sideways behind the own vehicle V.

The above-described detection regions $A_1$ and $A_2$ may be set up based on relative positions with respect to the own vehicle V or may be set up based on positions of white lines. When setting up the detection regions based on the positions of the white lines, the travel distance detection device 1 can utilize existing white line recognition techniques, for example. Moreover, the solid object detection unit 33 recognizes sides of the set up detection regions $A_1$ and $A_2$ located close to the own vehicle V (the sides in a running direction) as grounding lines $L_1$ and $L_2$. In general, the grounding line refers to a line where the solid object contacts the ground. However, in the embodiment, the grounding line is defined as described above instead of the line to contact the ground. In this case as well, a difference between the grounding line according to the embodiment and the grounding line obtained from the actual position of the other vehicle V does not become too large. Accordingly, there is no practical problem.

Figure 5:
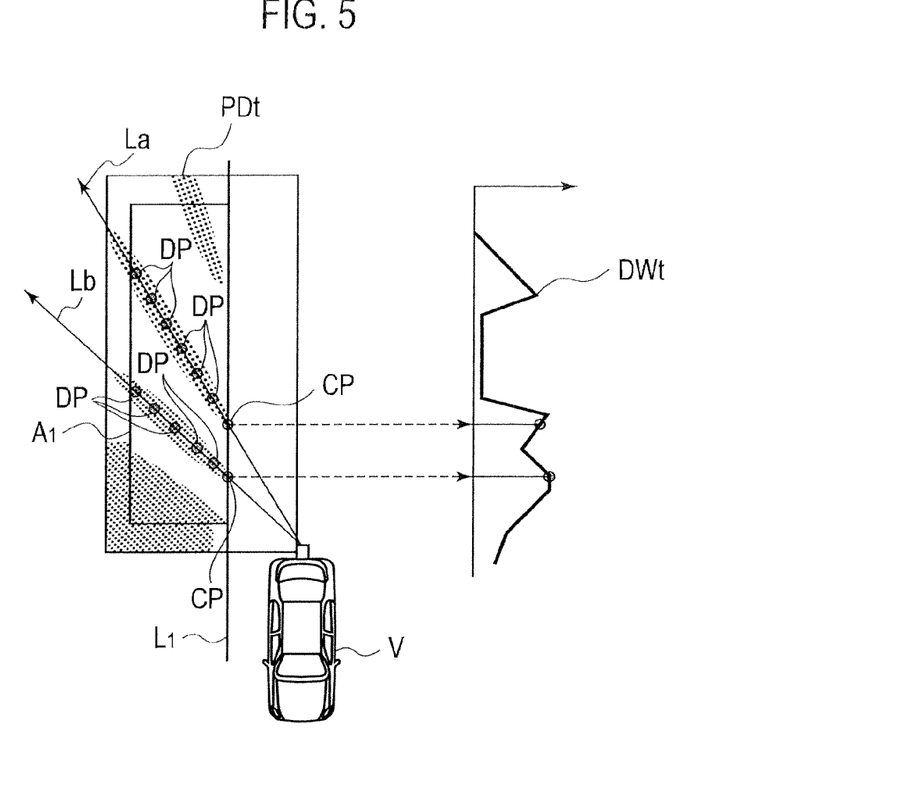
FIG. 5 is a schematic diagram showing an aspect of generation of a difference waveform by a solid object detection unit shown in FIG. 3.

FIG. 5 is a schematic diagram showing an aspect of generation of the difference waveform by the solid object detection unit 33 shown in FIG. 3. As shown in FIG. 5, the solid object detection unit 33 generates a difference waveform $DW_t$ by using portions of the difference image $PD_t$ which correspond to the detection regions $A_1$ and $A_2$. In this case, the solid object detection unit 33 generates the difference waveform $DW_t$ in an inclined direction in which the solid object is inclined due to the viewpoint conversions. Note that only the detection region $A_1$ is used to explain the example shown in FIG. 5 for the sake of convenience.

To be more precise, the solid object detection unit 33 firstly defines a line La in the inclined direction of the solid object on the data of the difference image $DW_t$. Then, the solid object detection unit 33 counts the number of difference pixels DP expressing given differences on the line La. Here, the difference pixel DP expressing the given difference is a pixel with a pixel value of the difference image $DW_t$ exceeding a predetermined threshold when the pixel value of the difference image $DW_t$ is defined as the absolute value of the difference between the pixel values of the bird's-eye view images $PB_t$ and $PB_{t-1}$. Alternatively, the difference pixel DP is a pixel having "1" as a pixel value of the difference image $DW_t$ when the pixel value of the difference image $DW_t$ is expressed as either "0" or "1".

After counting the number of the difference pixels DP, the solid object detection unit 33 finds an intersection CP of the line La and the grounding line $L_1$. Then, the solid object detection unit 33 links the intersection CP with the counted number, determines a position on the horizontal axis, namely a position along an axis in the vertical direction on the sheet surface in FIG. 5, based on the position of the intersection CP, and determines a position on the vertical axis, namely a position along an axis in the horizontal direction on the sheet surface in FIG. 5, based on the counted number.

Likewise, the solid object detection unit 33 defines a line in the inclined direction of the solid object, counts the number of the difference pixels DP, determines the position on the horizontal axis based on the position of the intersection CP, and determines the position on the vertical axis based on the counted number (the number of the difference pixels DP). The solid object detection unit 33 sequentially repeats the above-described procedures and produces a frequency distribution to generate the difference waveform $DW_t$.

Here, as shown in FIG. 5, the line La and a line Lb in the inclined directions of the solid objects have mutually different distances which overlap the detection region $A_1$. For this reason, if the detection region $A_1$ is filled with the difference pixels DP, the number of the difference pixels on the line La becomes larger than that on the line Lb. Accordingly, when the position on the vertical position is determined based on the counted number of the difference pixels DP, the solid object detection unit 33 performs normalization based on the distances of the lines La and Lb overlapping the detection region $A_1$ in the inclined directions of the solid objects. To be more precise, there are six difference pixels DP on the line La and five difference pixels DP on the line Lb in FIG. 5. Accordingly, to determine the positions on the vertical axis based on the counted numbers in FIG. 5, the solid object detection unit 33 performs normalization by dividing the counted numbers by the overlapping distances, for example. In this way, values of the difference waveform $DW_t$ corresponding to the lines La and Lb in the inclined directions of the solid objects become substantially equal to each other.

After generating the difference waveform $DW_t$, the solid object detection unit 33 calculates the travel distance by comparison with a difference waveform $DW_{t-1}$ at the time one moment earlier. Specifically, the solid object detection unit 33 calculates the travel distance based on time variation of the difference waveforms $DW_t$ and $DW_{t-1}$.

Figure 6:
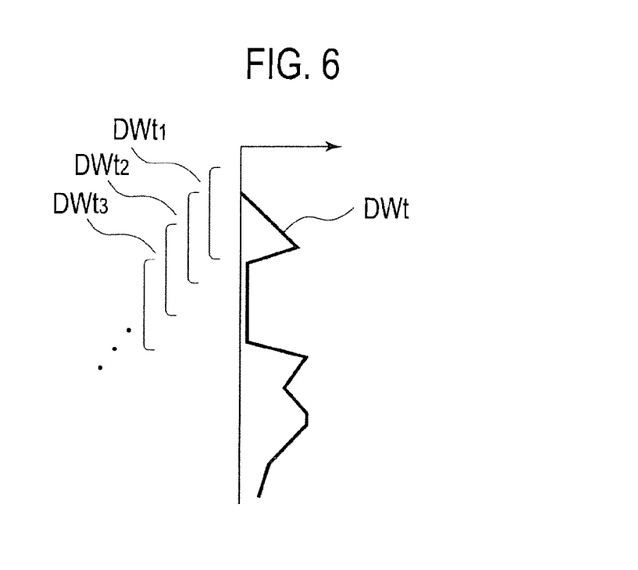
FIG. 6 is a view showing small regions divided by the solid object detection unit shown in FIG. 3.

To be more precise, the solid object detection unit 33 divides the difference waveform $DW_t$ into multiple small regions $DW_{t1}$ to $DW_{tn}$. n is an arbitrary integer of 2 or more. FIG. 6 is a view showing the small regions $DW_{t1}$ to $DW_{tn}$ divided by the solid object detection unit 33 shown in FIG. 3. As shown in FIG. 6, for example, the small regions $DW_{t1}$ to $DW_{tn}$ are divided so as to overlap one another. For instance, the small region $DW_{t1}$ overlaps the small region $DW_{t2}$ and the small region $DW_{t2}$ overlaps the small region $DW_{t3}$.

Subsequently, the solid object detection unit 33 obtains an offset amount, namely a travel amount of the difference waveform in the horizontal axis direction, for each of the small regions $DW_{t1}$ to $DW_{tn}$. Here, the offset amount is obtained as a difference which is the distance in the horizontal axis direction between the difference waveform $DW_{t1-1}$ at the time one moment earlier and the difference waveform $DW_{t1}$ at the current time. In this case, the solid object detection unit 33 determines a position in the horizontal axis direction to minimize the difference from the difference waveform $DW_{t1}$ at the current time when the difference waveform $DW_{t1-1}$ at the time one moment earlier is moved in the horizontal axis direction for each of the small regions $DW_{t1}$ to $DW_{tn}$. Then, the solid object detection unit 33 obtains the travel amount in the horizontal axis direction between an original position of the difference waveform $DW_{t-1}$ and the position to minimize the difference as the offset amount. Thereafter, the solid object detection unit 33 produces a histogram by counting the offset amounts that are obtained for each of the small regions $DW_{t1}$ to $DW_{tn}$.

Figure 7:
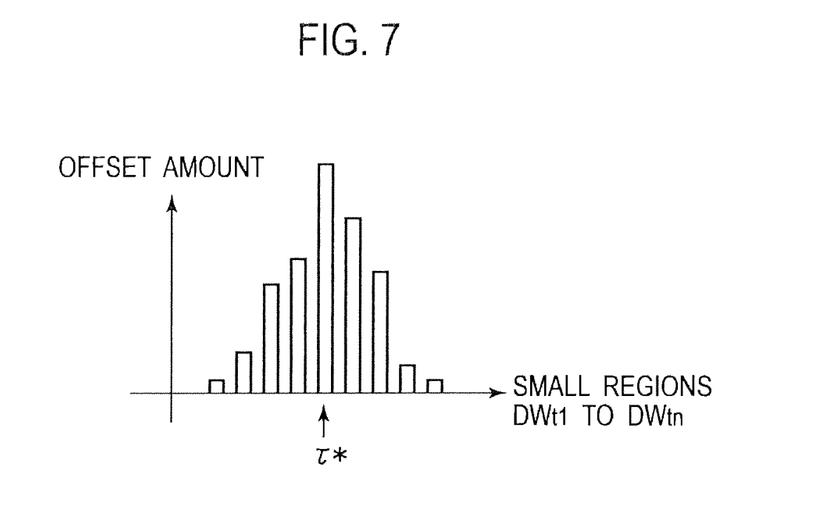
FIG. 7 is a graph showing an example of a histogram obtained by the solid object detection unit shown in FIG. 3.

FIG. 7 is a graph showing an example of a histogram obtained by the solid object detection unit 33 shown in FIG. 3. As shown in FIG. 7, there are some fluctuations among the offset amounts representing the travel amounts so as to minimize the differences between the respective small regions $DW_{t1}$ to $DW_{tn}$ and the difference waveform $DW_{t1-1}$ at the time one moment earlier. For this reason, the solid object detection unit 33 makes the offset amounts containing such fluctuations into the histogram and then calculates the travel distance by using the histogram. In this case, the solid object detection unit 33 calculates the travel distance of the solid object by using a local maximum value in the histogram. Specifically, in the example shown in FIG. 7, the solid object detection unit 33 calculates the travel distance as $\tau^*$. The travel distance $\tau^*$ is a relative distance of the other vehicle V with respect to the own vehicle V. Accordingly, to calculate an absolute travel distance, the solid object detection unit 33 calculates the absolute travel distance based on the travel distance as $\tau^*$ thus obtained and on the signal from the car speed sensor 20.

Figure 8:
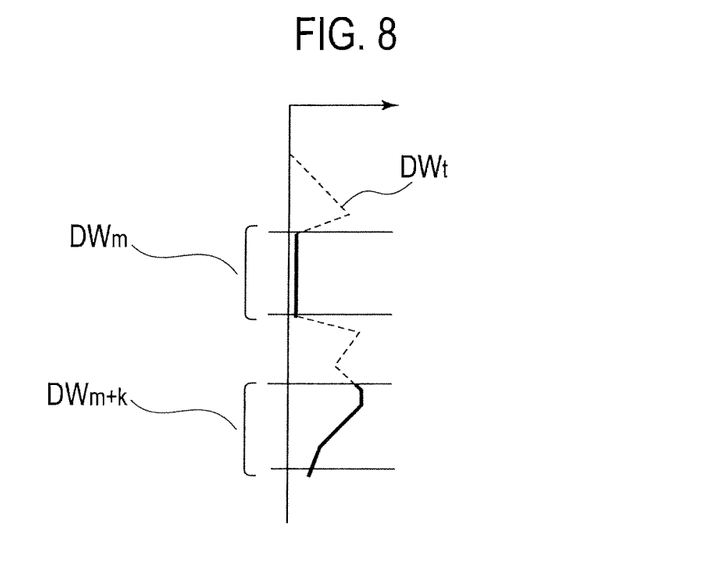
FIG. 8 is a view showing weighting by the solid object detection unit shown in FIG. 3.

Here, to produce the histogram, the solid object detection unit 33 preferably assigns a weight to each of the multiple small regions $DW_{t1}$ to $DW_{tn}$, and produces the histogram while counting the offset amounts obtained for the small regions $DW_{t1}$ to $DW_{tn}$ depending on the weights. FIG. 8 is a view showing the weighting by the solid object detection unit 33 shown in FIG. 3.

As shown in FIG. 8, a small region $DW_m$ is flat. m is an integer of 1 or more but n−1 or less. Specifically, the small region $DW_m$ has a small difference between a maximum counted value and a minimum counted value of the number of pixels showing a given difference. The solid object detection unit 33 reduces the weight for the small region $DW_m$. This is because the flat small region $DW_m$ has no characteristics and therefore has a high risk of increasing the difference in calculating the offset amount.

On the other hand, a small region $DW_{m+k}$ is rugged. k is an integer of n-m or less. Specifically, the small region $DW_{m+k}$ has a large difference between the maximum counted value and the minimum counted value of the number of pixels showing the given difference. The solid object detection unit 33 increases the weight for the small region $DW_{m+k}$ because the rugged small region $DW_{m+k}$ has characteristic and therefore has a high possibility of allowing accurate calculation of the offset amount. By assigning weights as described above, it is possible to improve calculation accuracy of the travel distance.

Here, in the above-described embodiment, the difference waveform $DW_t$ is divided into the multiple small regions $DW_{t1}$ to $DW_{tn}$ in order to improve calculation accuracy of the travel distance. However, the invention is not limited only to this configuration, and the difference waveform $DW_t$ is not always needed to be divided into the multiple small regions $DW_{t1}$ to $DW_{tn}$ when high calculation accuracy of the travel distance is not required. In this case, the solid object detection unit 33 calculates the travel distance based on the offset amount of the difference waveform $DW_t$ when the difference between the difference waveform $DW_t$ and the difference waveform $DW_{t-1}$ becomes smallest. That is to say, the method of obtaining the offset amount between the difference waveform $DW_{t-1}$ at the time one moment earlier and the difference waveform $DW_t$ at the current time is not limited only to the above-described contents.

Reference is made again to FIG. 3. The calculator 30 further includes a smear detection unit (smear detecting means) 34. The smear detection unit 34 is configured to detect an occurrence region of a smear by using the data of the images captured by the camera 10.

Figure 9:
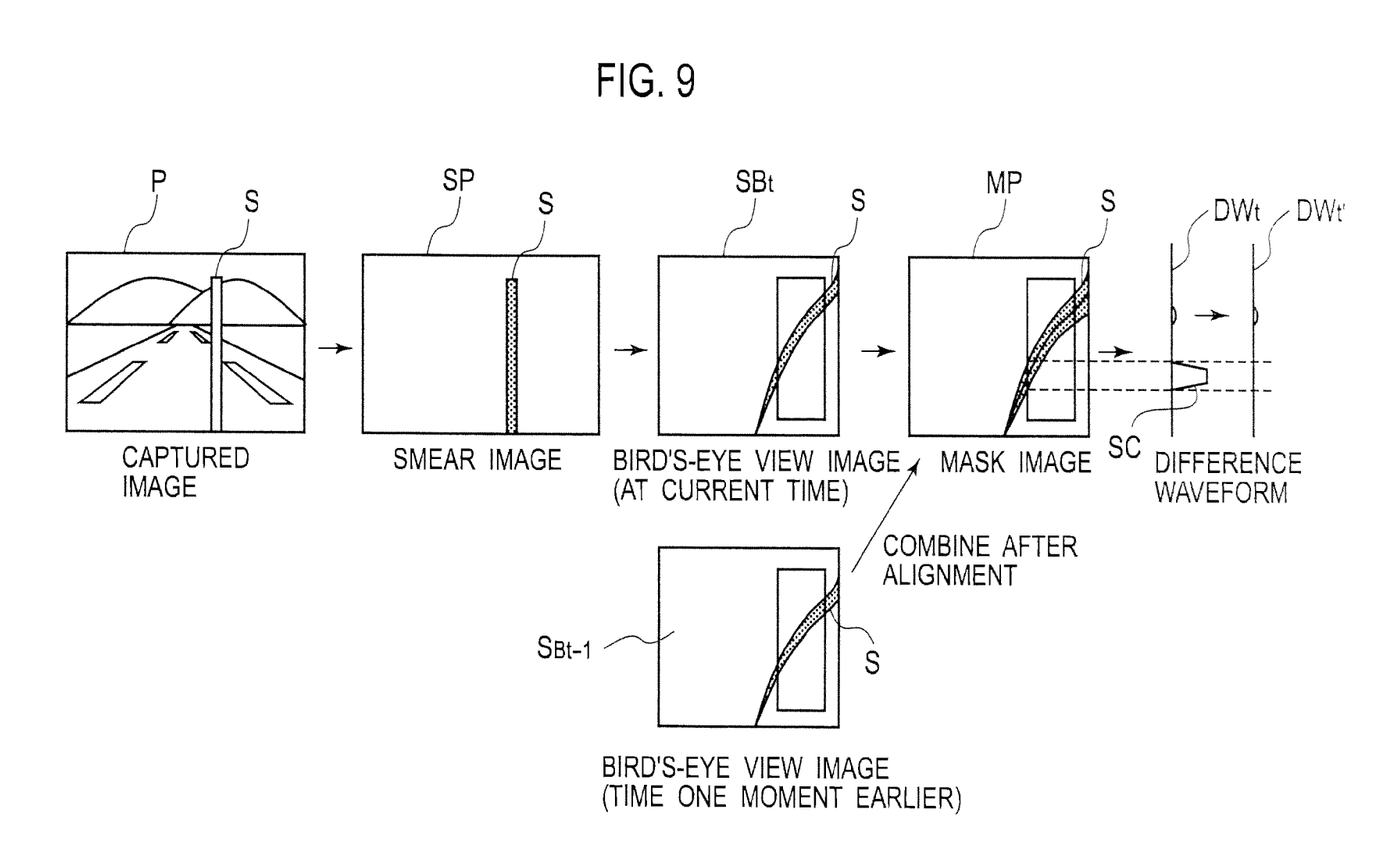
FIG. 9 is view showing processing by a smear detection unit shown in FIG. 3 and processing to calculate a difference waveform by this unit.

FIG. 9 is view showing processing by the smear detection unit 34 shown in FIG. 3 and processing to calculate a difference waveform $DW_t$ by this unit. First, data of a captured image P containing a smear S are assumed to be inputted to the smear detection unit 34. In this case, the smear detection unit 34 detects the smear S from the captured image P.

Although there are various methods of detecting the smear S, the smear S extends only downward from a light source in an image in the case of a typical CCD (charge-coupled device) camera, for example. Accordingly, a region having an illuminance value equal to or above a predetermined value upward from a lower side of the image and being continuous in the vertical direction is searched and specified as the occurrence region of the smear S in the embodiment.

Meanwhile, the smear detection unit 34 generates data of a smear image SP by defining a pixel value of "1" for a position of occurrence of the smear S and defining a pixel value of "0" for other positions. After generating the data, the smear detection unit 34 transmits the data of the smear image SP to the viewpoint conversion unit 31.

When the data of the smear image SP are inputted, the viewpoint conversion unit 31 performs viewpoint conversion to convert the data into data of a bird's-eye view image. In this way, the viewpoint conversion unit 31 generates data of a smear bird's-eye view image $SB_t$. After generating the data, the viewpoint conversion unit 31 transmits the data of the smear bird's-eye view image $SB_t$ to the alignment unit 32. Meanwhile, the viewpoint conversion unit 31 transmits data of a smear bird's-eye view image $SB_{t-1}$ at the time one moment earlier to the alignment, unit 32.

The alignment unit 32 aligns the smear bird's-eye view images $SB_t$ and $SB_{t-1}$ on the data. Concrete procedures of the alignment are similar to the case of aligning the bird's-eye view images $PB_t$ and $PB_{t-1}$ on the data. Meanwhile, after the alignment, the alignment unit 32 calculates a logical sum of the occurrence regions of the smear S in the respective smear bird's-eye view images $SB_t$ and $SB_{t-1}$. In this way, the alignment unit 32 generates data of a mask image MP. After generating the data, the alignment unit 32 transmits the data of the mask image MP to the solid object detection unit 33.

The solid object detection unit 33 sets the counted number of the frequency distribution equal to zero for a position in the mask image MP corresponding to the occurrence region of the smear S. Specifically, when the difference waveform $DW_t$ as shown in FIG. 9 is generated, the solid object detection unit 33 sets the counted number SC attributable to the smear S equal to zero, thereby generating a corrected difference waveform $DW_t'$.

Moreover, in the embodiment, the solid object detection unit 33 obtains a traveling speed of the vehicle V (the camera 10) and finds an offset amount for a stationary object by using the traveling speed thus obtained. After finding the offset amount of the stationary object, the solid object detection unit 33 calculates the travel distance of the solid object while ignoring the offset amount corresponding to the stationary object out of the local maximum value in the histogram.

Figure 10:
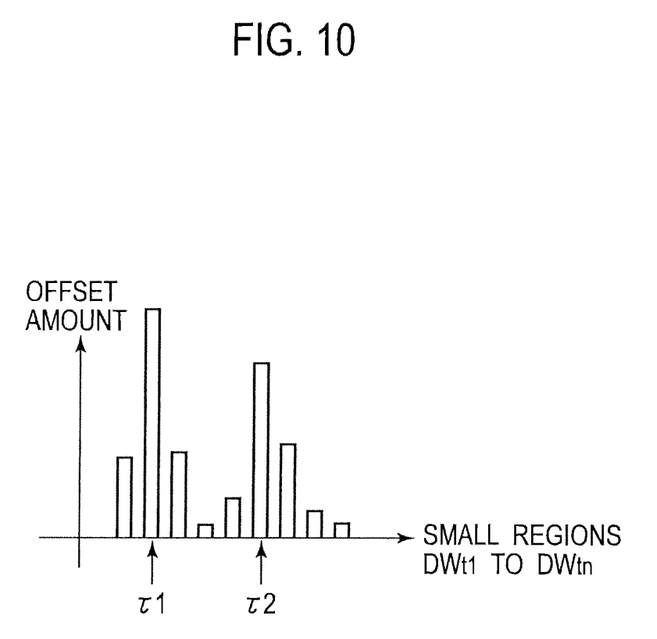
FIG. 10 is a graph showing another example of a histogram obtained by the solid object detection unit shown in FIG. 3.

FIG. 10 is a graph showing another example of a histogram obtained by the solid object detection unit 33 shown in FIG. 3. When there is a stationary object in addition to the other vehicle V within a view angle of the camera 10, two local maximum values τ1 and τ2 appear in the obtained histogram. In this case, one of the two local maximum values τ1 and τ2 represents the offset amount of the stationary object. Accordingly, the solid object detection unit 33 finds the offset amount for the stationary object by using the traveling speed, and calculates the travel distance of the sold object by ignoring the local maximum value corresponding to the offset amount while adopting the other local maximum value.

Here, if there still remain multiple local maximum values after ignoring the offset amount corresponding to the stationary object, then it is conceivable that there are two or more other vehicles V within the view angle of the camera 10. However, it is extremely rare that there are two or more other vehicles V within the detection regions $A_1$ and $A_2$. Therefore, the solid object detection unit 33 aborts calculation of the travel distance in this case.

Figure 11:
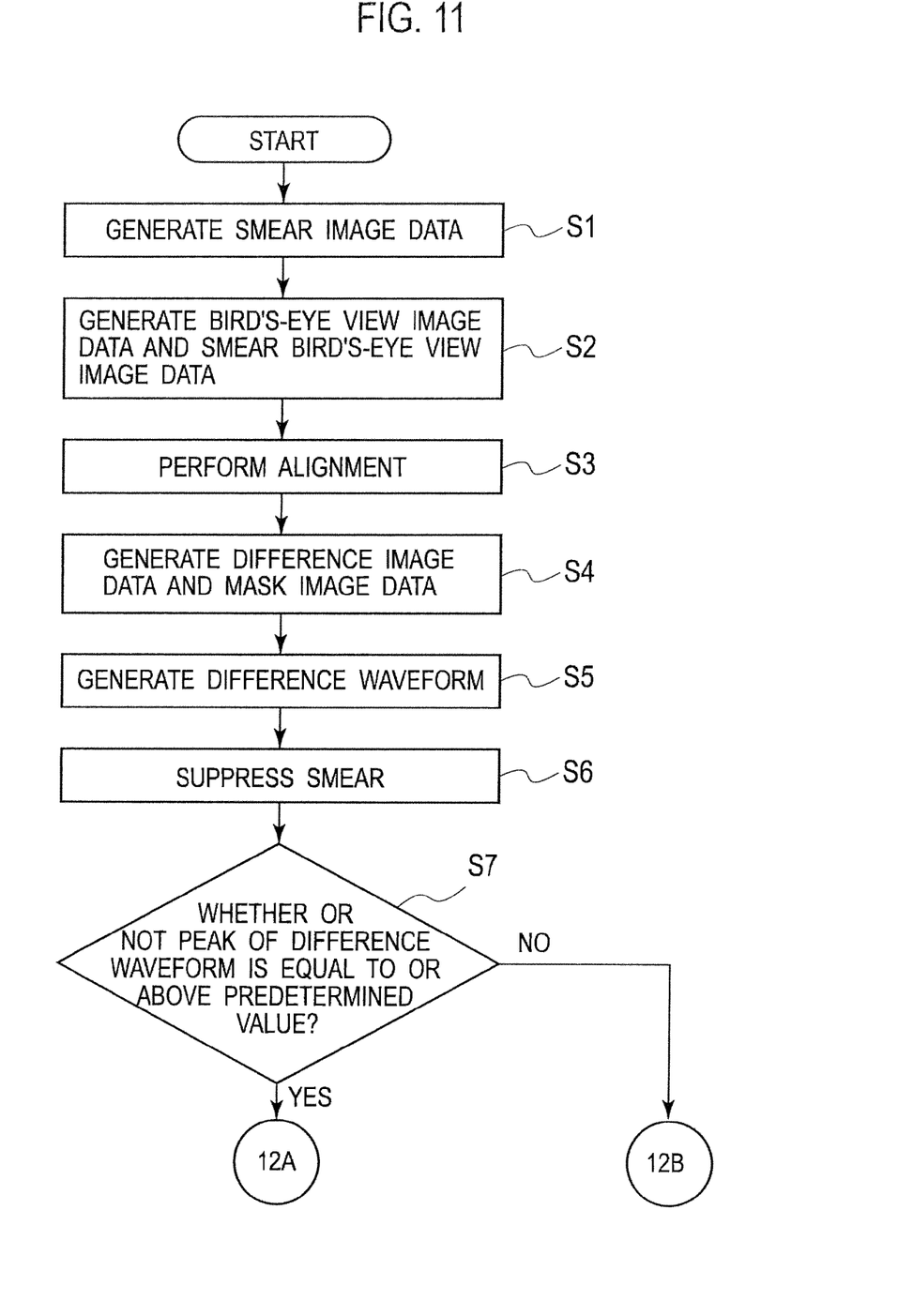
FIG. 11 is a flowchart showing a travel distance detection method according to the embodiment, illustrating a first half of processing.
Figure 12:
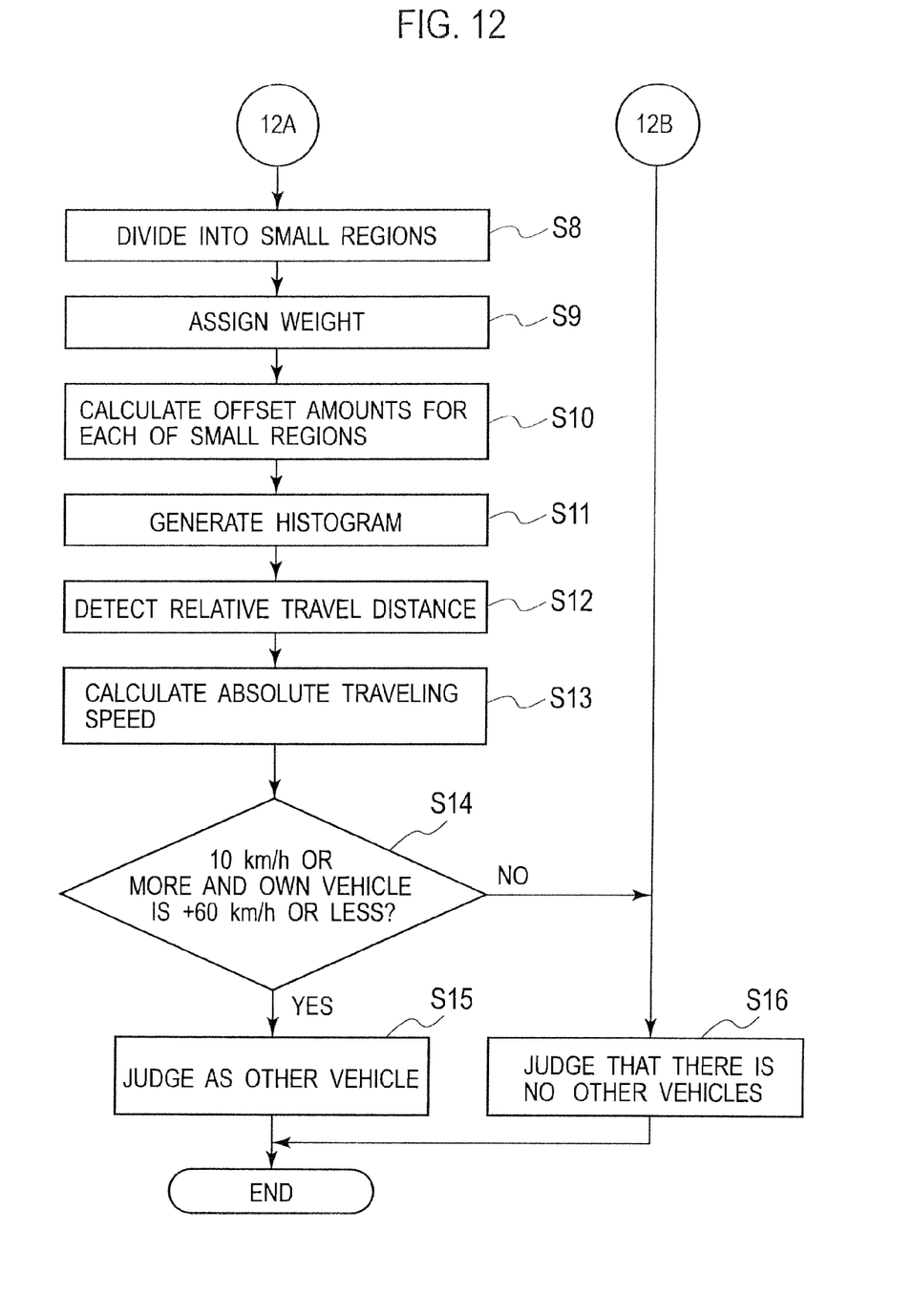
FIG. 12 is a flowchart showing the travel distance detection method according to the embodiment, illustrating a second half of processing.

Next, a travel distance detection method according to the embodiment will be described. FIG. 11 and FIG. 12 are flowcharts showing a travel distance detection method according to the embodiment. As shown in FIG. 11, the calculator 30 firstly inputs the data of the captured image P and generates the smear image SP by using the smear detection unit 34 (S1). Subsequently, the viewpoint conversion unit 31 generates the data of the bird's-eye view image $PB_t$ by using the data of the captured image P from the camera 10, and generates the data of the smear bird's-eye view image $SB_t$ by using the data of the smear image SP (S2).

Thereafter, the alignment unit 32 aligns the data of the bird's-eye view image $PB_t$ and the data of the bird's-eye view image $PB_{t-1}$ at the time one moment earlier, and aligns the data of the smear bird's-eye view image $SB_t$ and the data of the smear bird's-eye view image $SB_{t-1}$ at the time one moment earlier (S3).

After the alignment, the alignment unit 32 generates the data of the difference image $PD_t$ and generates the data of the mask image MP (S4). Then, the solid object detection unit 33 generates the difference waveform $DW_t$ by using the data of the difference image $PD_t$ and the data of the difference image $PD_{t-1}$ at the time one moment earlier (S5). After generating the difference waveform, the solid object detection unit 33 sets the counted number in the difference waveform $DW_t$ corresponding to the occurrence region of the smear S equal to zero, thereby suppressing an influence of the smear S (S6).

Subsequently, the solid object detection unit 33 judges whether or not a peak of the difference waveform $DW_t$ is equal to or above a predetermined value (S7). Here, if the peak of the difference waveform $DW_t$ is not equal to or above the predetermined value, then it is conceivable that there is very little difference and therefore no solid object in the captured image P. Accordingly, if the solid object detection unit 33 judges that the peak of the difference waveform $DW_t$ is not equal to or above the predetermined value (S7: NO), then the solid object detection unit 33 judges that there are no solid objects, namely no other vehicles (FIG. 12: S16). Then, the processing shown in FIG. 11 and FIG. 12 is terminated.

On the other hand, if the solid object detection unit 33 judges that the peak of the difference waveform $DW_m$ is equal to or above the predetermined value (S7: YES), then the solid object detection unit 33 judges that the solid object is present and divides the difference waveform $DW_t$ into the multiple small regions $DW_{t1}$ to $DW_{tn}$ (S8). Subsequently, the solid object detection unit 33 assigns a weight to each of the multiple small regions $DW_{t1}$ to $DW_{tn}$ (S9). Thereafter, the solid object detection unit 33 calculates the offset amounts for each of the multiple small regions $DW_{t1}$ to $DW_{tn}$ (S10) and generates the histogram in consideration of the weights (S11).

Then, the solid object detection unit 33 calculates the relative travel distance based on the histogram, which represents the travel distance of the solid object with respect to the own vehicle V (S12). Next, the solid object detection unit 33 calculates an absolute traveling speed of the solid object by using the relative travel distance (S13). At this time, the solid object detection unit 33 calculates the relative travel speed by subjecting the relative travel distance to temporal differentiation, and calculates the absolute traveling speed by adding the speed of the own vehicle detected by the vehicle speed sensor 20.

Thereafter, the solid object detection unit 33 judges whether or not the absolute traveling speed of the solid object is 10 km/h or more and a relative traveling speed of the solid object with respect to the own vehicle V is +60 km/h or less (S14). If both of the conditions are met (S14: YES), the solid object detection unit 33 judges the solid object as the other vehicle V (S15). Then, the processing shown in FIG. 11 and FIG. 12 is terminated. On the other hand, if any one of the conditions is not met (S14: NO), the solid object detection unit 33 judges that there is no other vehicles (S16). Thereafter, the processing shown in FIG. 11 and FIG. 12 is terminated.

Note that the detection regions $A_1$ and $A_2$ are defined sideways behind the own vehicle V in the embodiment so as to focus on a judgment as to whether or not the own vehicle V has a risk of contact when changing lanes. The processing in step S14 is executed for this purpose. For example, assuming that the system according to the embodiment is operated on a highway, the presence of the other vehicle V does not cause any problem if the speed of the solid object is below 10 km/h because the solid object is located far behind the own vehicle V when the own vehicle changes the lanes. Similarly, if the relative travel speed of the solid object with respect to the own vehicle V exceeds +60 km/h, i.e., if the solid object is traveling at a speed faster by +60 km/h than the speed of the own vehicle V, there is no problem because the solid object moves forward of the own vehicle V when the own vehicle changes the lanes. For this reason, it is also possible to say that step S14 is provided in order to judge the other vehicle V which may cause a problem at the time of the lane change.

Moreover, in step S14, the following effect is achieved by judging whether or not the absolute traveling speed of the solid object is 10 km/h or more and the relative traveling speed of the solid object with respect to the own vehicle V is +60 km/h or less. Specifically, there may be a case where the absolute traveling speed of the stationary object is erroneously detected as several km/h due to an installation error of the camera 10, for example. Therefore, it is possible to reduce the risk of judging the stationary object as the other vehicle V by judging whether or not the object has the absolute traveling speed of 10 km/h or more. Meanwhile, there may be a case where the relative speed of the solid object with respect to the own vehicle V is erroneously detected as +60 km/h or more due to noise. Therefore, it is possible to reduce the risk of erroneous detection due to the noise by judging whether or not the relative speed is +60 km/h or less.

Further, it is also possible to judge that the absolute traveling speed is not negative or not 0 km/h instead of the processing in step S14. Meanwhile, the embodiment focuses on the judgment as to whether or not the own vehicle V has the risk of contact when changing the lanes. Accordingly, when the other vehicle V is detected in step S15, it is possible to set off an alarm to a driver of the own vehicle or to display an alarm and the like on a given display device.

As described above, according to the travel distance detection device 1 and the travel distance detection method of the embodiment, the difference waveform $DW_t$ is generated by counting the number of pixels expressing a given difference on the data of the difference image $PD_t$ in the direction in which the solid object is inclined due to the viewpoint conversion and producing the frequency distribution using the counted number of the pixels. Here, the pixels expressing the given difference on the data of the difference image $PD_t$ represent the pixels which are changed between the images captured at different times. In other words, the pixels indicate the position where the solid object is present. Accordingly, in the position where the solid object is present, the difference waveform $DW_t$ is generated by counting the number of pixels in the inclined direction of the solid object and then producing the frequency distribution. Specifically, since the number of pixels is counted in the inclined direction of the solid object, the difference waveform $DW_t$ is generated by using information on the height direction of the solid object. Moreover, the travel distance of the solid object is calculated based on time variation of the difference waveform $DW_t$ which contains the information on the height direction. Accordingly, as compared to a case of simply focusing on the travel of a single point, a position of detection before the time variation and a position of detection after the time variation are likely to be the same position on the solid object because those positions are specified in consideration of the information on the height direction. Since the travel distance is calculated based on the time variation of the same position, it is possible to improve calculation accuracy of the travel distance.

Moreover, the counted number of the frequency distribution in the portion of the difference waveform $DW_t$ corresponding to the occurrence region of the smear S is set equal to zero. In this way, a waveform region of the difference waveform $DW_t$ generated by the smear S is removed. Hence it is possible to avoid a trouble of erroneously recognizing the smear S as the solid object.

Moreover, the travel distance of the solid object is calculated based on the offset amount of the difference waveform $DW_t$ when the difference between the difference waveforms $DW_t$ generated at different times becomes smallest. Accordingly, the travel distance is calculated by using the offset amount of the one-dimensional information of the waveform. Hence it is possible to suppress calculation costs in calculating the travel distance.

Further, the difference waveforms $DW_t$ generated at different times are divided into the multiple small regions $DW_{t1}$ to $DW_{tn}$. By dividing the difference waveforms $DW_t$ into the multiple small regions $DW_{t1}$ to $DW_{tn}$ as described above, it is possible to obtain multiple waveforms representing respective positions of the solid object. Meanwhile, the offset amounts to minimize the differences between the respective waveforms are obtained for each of the small regions $DW_{t1}$ to $DW_{tn}$. Then, the travel distance of the solid object is calculated by counting the offset amounts obtained for each of the small regions $DW_{t1}$ to $DW_{tn}$ so as to produce the histogram. Accordingly, the offset amounts are obtained for each of the positions of the solid object, and the travel distance is obtained by using the multiple offset amounts. Hence it is possible to improve calculation accuracy of the travel distance.

Meanwhile, a weight is assigned to each of the multiple small regions $DW_{t1}$ to $DW_{tn}$. Then, the offset amounts obtained for the small regions $DW_{t1}$ to $DW_{tn}$ are counted depending on the weights so as to produce the histogram. Accordingly, it is possible to calculate the travel distance more properly by increasing the weight for the characteristic region while reducing the weight for the non-characteristic region. Therefore, it is possible to further improve calculation accuracy of the travel distance.

Moreover, for the respective small regions $DW_{t1}$ to $DW_{tn}$ of the difference waveform $DW_t$, the weight is increased as there is the larger difference between the maximum counted value and the minimum counted value of the number of pixels representing the given difference. As a consequence, the weight is increased in the case of the characteristic rugged region having the large difference between the maximum value and the minimum value, whereas the weight is reduced in the case of the region which is flat and not very rugged. Here, the accurate offset amount can be obtained, as for shape, more easily in the rugged region than in the flat region. Accordingly, it is possible to further improve calculation accuracy of the travel distance by assigning the larger weight to the region having the larger difference between the maximum value and the minimum value.

Meanwhile, the travel distance of the solid object is calculated by using the local maximum value in the histogram obtained by counting the offset amounts found for the small regions $DW_{t1}$ to $DW_{tn}$. Accordingly, even when there are the fluctuations of the offset amounts, it is still possible to calculate the travel distance more accurately by using the local maximum value.

Moreover, the offset amount is obtained for the stationary object and this offset amount is ignored. Accordingly, it is possible to avoid a trouble of reduction in calculation accuracy of the travel distance of the solid object attributable to the stationary object.

In the meantime, calculation of the travel distance of the solid object is aborted if there still remain the multiple local maximum values after ignoring the offset amount corresponding to the stationary object. Accordingly, it is possible to avoid a trouble of calculating the travel distance erroneously by reflecting the multiple local maximum values.

Although the present invention has been described with reference to the embodiment, it is to be understood that the present invention is not limited only to the above-described embodiment and that various modifications can be made without departing from the scope of the invention.

For example, in the above-described embodiment, the vehicle speed of the own vehicle V is judged based on the signal from the vehicle speed sensor 20. However, the present invention is not limited only to this configuration, and the speed may be estimated by using multiple imaged captured at different mes. In this case, it is not necessary to provide the vehicle speed sensor. Hence it is possible to simplify the configuration.

According to the above-described embodiment, the image captured at the current time and the image captured at the time one moment earlier are converted into the bird's-eye view images and the difference image $PD_t$ is generated by performing alignment of the converted bird's-eye view images. Then, the difference waveform $DW_t$ is generated by evaluating the generated difference image $PD_t$ in the inclined direction, i.e., the direction to which the solid object is inclined as a result of conversion of the captured images into the bird's-eye view images. However, the present invention is not limited only to this configuration. For example, the difference waveform $DW_t$ may be generated in the following way: only the image at the time one moment earlier is converted into the bird's-eye view image; the converted bird's-eye view image is converted again into the originally captured image after alignment of the converted bird's-eye view image is performed; a difference image between this image and the image at the current time is generated; and the generated difference image is evaluated in a direction corresponding to the inclined direction, i.e., a direction obtained by converting the inclined direction into the original direction in the captured image. In other words, the actual bird's-eye view image does not always have to be generated explicitly as long as it is possible to align the image at the current time with the image at the time one moment earlier, to generate the difference image $PD_t$ by using the difference between the two images aligned, and to evaluate the difference $PD_t$ in the direction in which the solid object is inclined when the difference image $PD_t$ is converted into the bird's-eye view image.

This application is based on prior Japanese Patent Application No. 2010-140319 (filed Jun. 21, 2010 in Japan). The entire contents of the Japanese Patent Application No. 2010-140319 from which priority is claimed are incorporated herein by reference, in order to take some protection against translation errors or omitted portions.

What is claimed is:

1. A travel distance detection device comprising:
   an image-capturing unit mounted on a rear part of a vehicle and configured to capture, at a predetermined downward view angle, an image of a predetermined region comprising at least one detection region;
   an alignment unit configured to align images of the predetermined region in a position of a bird's-eye view image, the images being captured at different times by the image-capturing unit; and
   a solid object detection unit configured to detect a solid object based on difference image data for the at least one detection region between data of the images captured at the different times and aligned by the alignment unit,
   wherein the solid object detection unit is configured to
      define at least one line in a direction in which a solid object is inclined when the image of the predetermined region is converted into the bird's-eye view image,
      count a number of pixels on the at least one line, each pixel expressing a certain difference with respect to the difference image data,
      locate an intersection between the at least one line and a reference line in a running direction of the vehicle,
      determine a position on an axis, the position corresponding to the counted number of pixels on the at least one line,
      produce a frequency distribution of the counted number of pixels along the reference line in the running direction of the vehicle,
      generate a difference waveform in the inclined direction in which the solid object is inclined due to conversion to the bird's-eye view image, and
      calculate a travel distance of the solid object based on time variation of the difference waveform.

2. The travel distance detection device according to claim 1, further comprising a viewpoint conversion unit configured to perform viewpoint conversion to convert the image of the predetermined region captured by the image-capturing unit into the bird's-eye view image, wherein:
   the alignment unit is configured to perform position alignment to coincide with each other position of bird's-eye view image data at different times after viewpoint conversion by the viewpoint conversion unit, and
   based on difference image data of the bird's-eye view image data at the different times as aligned by the alignment unit, the solid object detection unit is configured to detect the solid object.

3. The travel distance detection device according to claim 2, further comprising
   a smear detection unit configured to detect an occurrence region of a smear from any of the images captured by the image-capturing unit, wherein the solid object detection unit is configured to set a counted number of the frequency distribution equal to zero for a position in the difference waveform within the occurrence region of the smear detected by the smear detection unit.

4. The travel distance detection device according to claim 2, wherein the solid object detection unit is configured to calculate the travel distance of the solid object in accordance with an offset amount of the difference waveform, based on a difference waveform overlapped with another difference waveform generated at a different time with a minimum difference.

5. The travel distance detection device according to claim 4, wherein the solid object detection unit is configured to
divide each of the difference waveforms generated at the different times into a plurality of regions,
calculate an offset amount of each of the difference waveforms for each of the regions, based on the difference waveform overlapped with another one of the difference waveforms with a minimum difference,
produce a histogram by counting the offset amounts calculated for each of the regions, and
calculate therefrom the travel distance of the solid object.

6. The travel distance detection device according to claim 5, wherein the solid object detection unit is configured to assign a weight to each of the plurality of regions, and count the offset amounts calculated for each of the regions depending on the weights to produce the histogram.

7. The travel distance detection device according to claim 6, wherein the solid object detection unit is configured to increase the weight for each of the regions of the difference waveforms as a difference between a maximum counted value and a minimum counted value of the number of pixels expressing a certain difference increases.

8. The travel distance detection device according to claim 5, wherein the solid object detection unit is configured to calculate the travel distance of the solid object based on a local maximum value in the histogram obtained by counting offset amounts calculated for each of the regions.

9. The travel distance detection device according to claim 8, wherein the solid object detection unit is configured to
find a traveling speed of the image-capturing unit to calculate offset amounts of a stationary object based on the found traveling speed, and
calculate the travel distance of the solid object by ignoring the offset amounts of the stationary object in a local maximum value in the histogram obtained by counting the offset amounts calculated for each of the regions.

10. The travel distance detection device according to claim 9, wherein the solid object detection unit is configured to abort calculation of the travel distance of the solid object if there are a plurality of local maximum values even after the offset amounts of the stationary object are ignored.

11. A travel distance detection method comprising:
performing viewpoint conversion to convert an image of a predetermined region comprising at least one detection region into a bird's-eye view image, the image captured by an image-capturing unit mounted on a rear part of a vehicle and configured to capture the image of the predetermined region at a predetermined downward view angle;
aligning positions in bird's-eye view image data at different times after the viewpoint conversion; and
detecting a solid object based on difference image data for the at least one detection region between the aligned bird's-eye view image data, wherein the detecting of the solid object based on difference image data between the aligned bird's-eye view image data comprises
defining at least one line in a direction in which a solid object is inclined when the image of the predetermined region is converted into the bird's-eye view image,
counting a number of pixels on the at least one line, each pixel expressing a certain difference with respect to the difference image data,
locating an intersection between the at least one line and a reference line in a running direction of the vehicle,
determining a position on an axis, the position corresponding to the counted number of pixels on the at least one line,
producing a frequency distribution of the counted pixels along the reference line in the running direction of the vehicle,
generating a difference waveform in the inclined direction in which the solid object is inclined due to conversion to the bird's-eye view image, and
calculating a travel distance of the solid object based on time variation of the difference waveform.

12. The travel distance detection method according to claim 11, further comprising:
detecting an occurrence region of a smear from any of the images captured by the image-capturing unit,
wherein the detecting of the solid object based on difference image data between the aligned bird's-eye view image data further comprises
setting the counted number of the frequency distribution equal to zero for a position in the difference waveform within the occurrence region of the smear.

13. The travel distance detection method according to claim 11, wherein the calculating the travel distance of the solid object based on time variation of the difference waveform comprises:
calculating the travel distance of the solid object in accordance with an offset amount of the difference waveform, based on a difference waveform overlapped with another difference waveform generated at a different time with a minimum difference.

14. The travel distance detection method according to claim 13, wherein the calculating the travel distance of the solid object in accordance with the offset amount of the difference waveform, based on the difference waveform overlapped with another difference waveform generated at a different time with a minimum difference comprises:
dividing each of the difference waveforms generated at the different times into a plurality of regions;
calculating an offset amount of each of the difference waveforms for each of the regions, based on the difference waveform overlapped with another one of the difference waveforms with a minimum difference; and
producing a histogram by counting the offset amounts calculated for each of the regions to calculate the travel distance of the solid object.

15. The travel distance detection method according to claim 14, wherein the producing the histogram by counting the offset amounts calculated for each of the regions to calculate the travel distance of the solid object comprises:
assigning a weight to each of the plurality of regions; and
counting the offset amounts calculated for each of the regions depending on the weights to produce the histogram.

16. The travel distance detection method according to claim 15, wherein the assigning the weight to each of the plurality of regions comprises:

increasing the weight for each of the regions of the difference waveforms as a difference between a maximum counted value and a minimum counted value of the number of pixels expressing a certain difference increases.

17. The travel distance detection method according to claim 14, wherein the producing the histogram by counting the offset amounts calculated for each of the regions to calculate the travel distance of the solid object comprises:

calculating the travel distance of the solid object based on a local maximum value in the histogram obtained by counting the offset amounts calculated for each of the regions.

18. The travel distance detection method according to claim 17, wherein the calculating the travel distance of the solid object by using the local maximum value in the histogram obtained by counting the offset amounts calculated for each of the regions comprises:

finding a traveling speed of the image-capturing unit to calculate offset amounts of a stationary object based on the found traveling speed; and calculating the travel distance of the solid object by ignoring the offset amounts of the stationary object in a local maximum value in the histogram obtained by counting the offset amounts calculated for each of the regions.

19. The travel distance detection method according to claim 18, wherein the calculating the travel distance of the solid object based on the local maximum value in the histogram obtained by counting the offset amounts calculated for each of the regions further comprises:

aborting calculation of the travel distance of the solid object if there are a plurality of local maximum values even after the offset amounts of the stationary object are ignored.

20. A travel distance detection device comprising:

means for capturing an image of a predetermined region comprising at least one detection region at a predetermined downward view angle, the means for capturing the image being mounted on a rear part of a vehicle;

means for aligning images of the predetermined region in a position of a bird's-eye view image, the images captured at different times by the means for capturing the image; and means for detecting a solid object based on difference image data for the at least one detection region between data of the images captured at the different times and aligned by the means for aligning images, wherein the means for detecting the solid object defines at least one line in a direction in which a solid object is inclined when the image of the predetermined region is converted into the bird's-eye view image, counts the number of pixels on the at least one line, each pixel expressing a certain difference with respect to the difference image data, locates an intersection between the at least one line and a reference line in a running direction of the vehicle, determines a position on an axis, the position corresponding to the counted number of pixels on the at least one line, produces a frequency distribution of the counted pixels along the reference line in the running direction of the vehicle, generates a difference waveform in the inclined direction in which the solid object is inclined due to conversion to the bird's-eye view image, and calculates a travel distance of the solid object based on time variation of the difference waveform.

21. A travel distance detection device comprising:

an image-capturing unit mounted on a vehicle and configured to capture an image of a predetermined region;

an alignment unit configured to align images of the predetermined region in a position of a bird's-eye view image, the images being captured at different times by the image-capturing unit; and a solid object detection unit configured to detect a solid object based on difference image data between data of the images captured at the different times and aligned by the alignment unit, wherein the solid object detection unit is configured to count a number of pixels each expressing a certain difference with respect to the difference image data and which are arranged in a direction in which the solid object is inclined when the image of the predetermined region is converted into the bird's-eye view image, then produce a frequency distribution of the counted number of pixels in a running direction of the vehicle to generate a difference waveform, divide each of difference waveforms generated at different times into a plurality of regions, calculate an offset amount of each of the difference waveforms for each of the regions, based on a difference waveform overlapped with another one of the difference waveforms with a minimum difference, produce a histogram by counting offset amounts calculated for each of the regions, and calculate the travel distance of the solid object based on the histogram.

* * * * *